United States Patent
Diop et al.

(10) Patent No.: US 10,128,582 B2
(45) Date of Patent: Nov. 13, 2018

(54) SPLICE WITH TAP CLAMP

(71) Applicant: Hubbell Incorporated, Shelton, CT (US)

(72) Inventors: Seydou Diop, Birmingham, AL (US); Adrian Beau Candelaria, Alabaster, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/667,842

(22) Filed: Aug. 3, 2017

(65) Prior Publication Data

US 2018/0076533 A1    Mar. 15, 2018

Related U.S. Application Data (60) Provisional application No. 62/385,358, filed on Sep. 9, 2016.

(51) Int. Cl.

| | |
|---|---|
| *H01R 4/38* | (2006.01) |
| *H01R 4/2408* | (2018.01) |
| *H01R 4/48* | (2006.01) |
| *H01R 11/15* | (2006.01) |
| *H01R 4/12* | (2006.01) |
| *H01R 4/36* | (2006.01) |
| *H01R 4/40* | (2006.01) |
| *H02G 1/02* | (2006.01) |

(52) U.S. Cl.
CPC ............ *H01R 4/2408* (2013.01); *H01R 4/12* (2013.01); *H01R 4/363* (2013.01); *H01R 4/4872* (2013.01); *H01R 11/15* (2013.01); *H01R 4/40* (2013.01); *H02G 1/02* (2013.01)

(58) Field of Classification Search
CPC ............... H01R 4/30; H01R 4/38; H01R 4/44
USPC .......................... 439/477–480, 803, 815–820
See application file for complete search history.

(56) References Cited

U.S. PATENT DOCUMENTS

| | | | |
|---|---|---|---|
| 2,738,840 A | 3/1956 | Hubbard | |
| 2,867,787 A | 1/1959 | Nilsson | |
| 3,487,160 A | 12/1969 | Johnsen | |
| 4,292,732 A | 10/1981 | Tucci | |

(Continued)

OTHER PUBLICATIONS

PCT/US2017/045241 International Search Report and Written Opinion dated Oct. 12, 2017 (12 pages).

*Primary Examiner* — Xuong Chung Trans
(74) *Attorney, Agent, or Firm* — Michael Best & Friedrich, LLP (57) ABSTRACT

A wire connection system for providing electrical communication between a first conductor and a second conductor includes a housing having a sidewall, a housing surface, and a housing channel. The sidewall extends between a first end and a second end and at least partially encloses a housing chamber. The connection system further includes at least one jaw supported for movement within the housing chamber and configured to engage the first conductor. The connection system further includes a clamp member at least partially disposed within the housing channel, the clamp member including a clamp surface proximate the housing surface in a facing relationship. The connection system further includes a linear actuator coupled to the housing and movable along a longitudinal axis, the linear actuator coupling the housing and the clamp member and movably coupled to the at least one jaw.

22 Claims, 8 Drawing Sheets

(56) References Cited

U.S. PATENT DOCUMENTS

| | | | |
|---|---|---|---|
| 5,278,353 A | 1/1994 | Bucholz et al. | |
| 5,369,849 A | 12/1994 | De France | |
| 5,547,404 A | 8/1996 | Nellis, Jr. et al. | |
| 7,160,142 B2 | 1/2007 | Hughes et al. | |
| 8,069,521 B2 | 12/2011 | Beck et al. | |
| 8,512,070 B2 * | 8/2013 | De France | H01R 4/38 439/479 |
| 8,727,819 B2 | 5/2014 | Giefers et al. | |
| 9,812,794 B2 * | 11/2017 | Cawood | H01R 4/40 |
| 2015/0107875 A1 | 4/2015 | Diop et al. | |

* cited by examiner

SPLICE WITH TAP CLAMP

CROSS-REFERENCE TO RELATED APPLICATION

This application claims the benefit of prior-filed, U.S. Provisional Patent Application No. 62/385,358, filed Sep. 9, 2016, the entire contents of which are hereby incorporated by reference.

BACKGROUND

The present disclosure relates to connectors for electrical conductors, and particularly to a splice connector with tap clamp.

SUMMARY

Conductor tap clamps are hot line connectors for tapping into or providing electrical communication with a main power line. In some applications, conductor tap clamps attach a first conductor to a second energized conductor engaged with a transformer.

Wire splices are connectors for joining electrical conductors, such as high voltage power lines. Automatic wire splicing connectors allow a user to easily join two different conductors by inserting each conductor into a different end of the wire splice. Wire splicing connectors may be used to quickly connect lengths of suspended cables during installation or repair of electrical lines.

In one aspect, a connection system for providing electrical contact between a first conductor and a second conductor includes a housing. The housing has a sidewall, a housing surface, and a housing channel, the sidewall extending between a first end and a second end, the sidewall at least partially enclosing a housing chamber. The connection system further includes at least one jaw supported for movement within the housing chamber and configured to engage the first conductor. The connection system further includes a clamp member at least partially disposed within the housing channel, the clamp member including a clamp surface proximate the housing surface in a facing relationship. The connection system further includes a linear actuator coupled to the housing and movable along a longitudinal axis, the linear actuator coupling the housing and the clamp member and movably coupled to the at least one jaw.

In another aspect, a method for providing electrical communication between a first conductor and a second conductor includes: positioning the first conductor between a first jaw and a second jaw disposed within a chamber of a housing; biasing the first jaw and the second jaw towards an end of the housing to secure the first conductor between the first jaw and the second jaw; positioning the second conductor between a surface of the housing and a surface of a clamp member, the surface of the housing and the surface of the clamp member having a facing relationship; and actuating a threaded member to decrease a distance between the clamp member and the wall to secure the second conductor between the surface of the housing and the surface of the clamp member.

In yet another aspect, a method for assembling a connector configured to engage a first conductor with a second conductor includes: inserting a linear actuator through an opening of a clamp member and a clamp member biasing member; inserting the linear actuator through an opening in a wall of a housing into a chamber of the housing; engaging a lockout member with an end of the linear actuator; inserting at least one jaw through an opening of the housing into the chamber; and biasing the at least one jaw towards a first end of the housing.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc. The terms "angled" and "at an angle" generally refer to a non-zero angle or non-parallel relationship between components.

Figure 1:
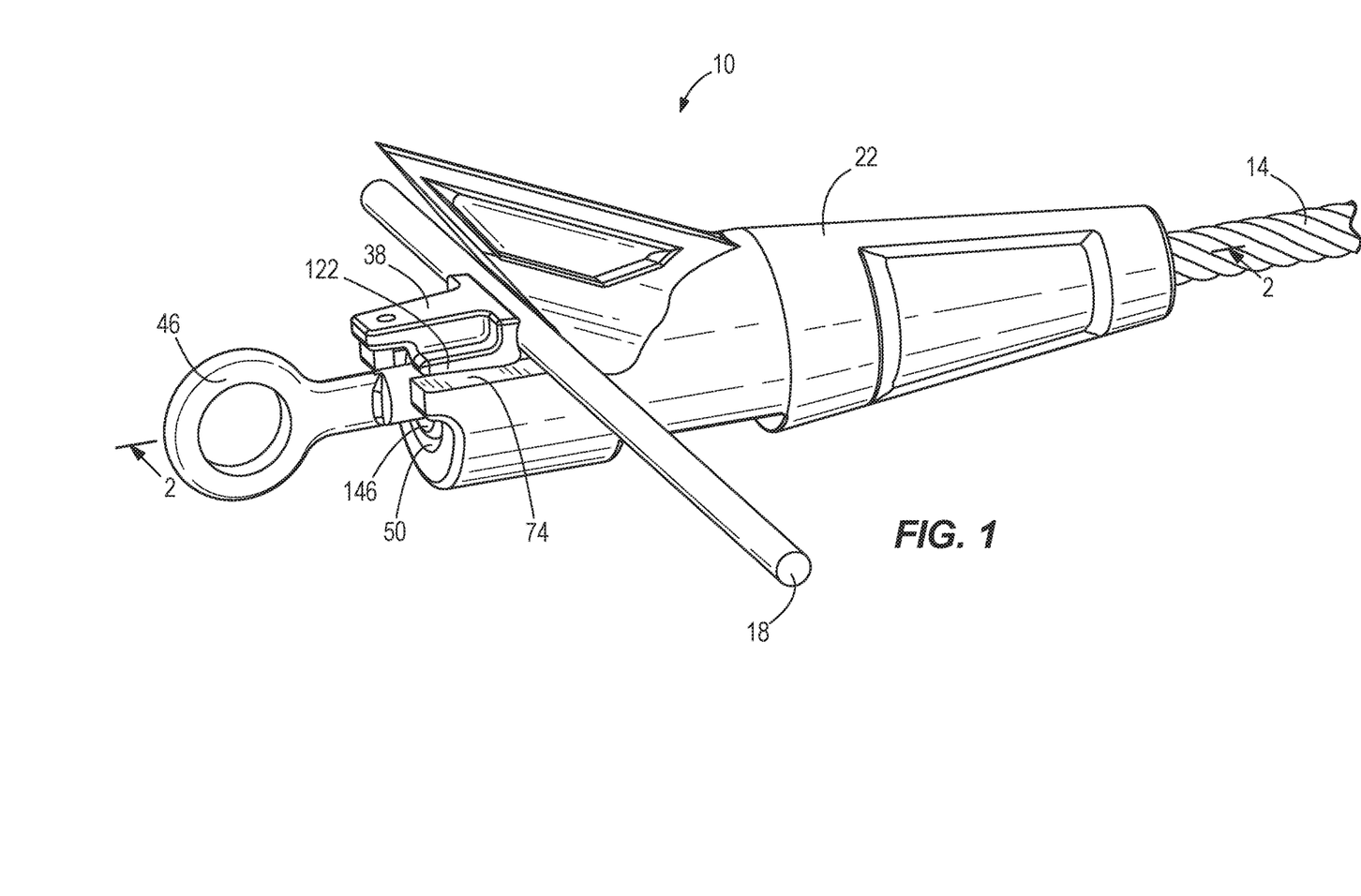
FIG. 1 is a perspective f a wire connection system, a first conductor, and a second conductor.
Figure 2:
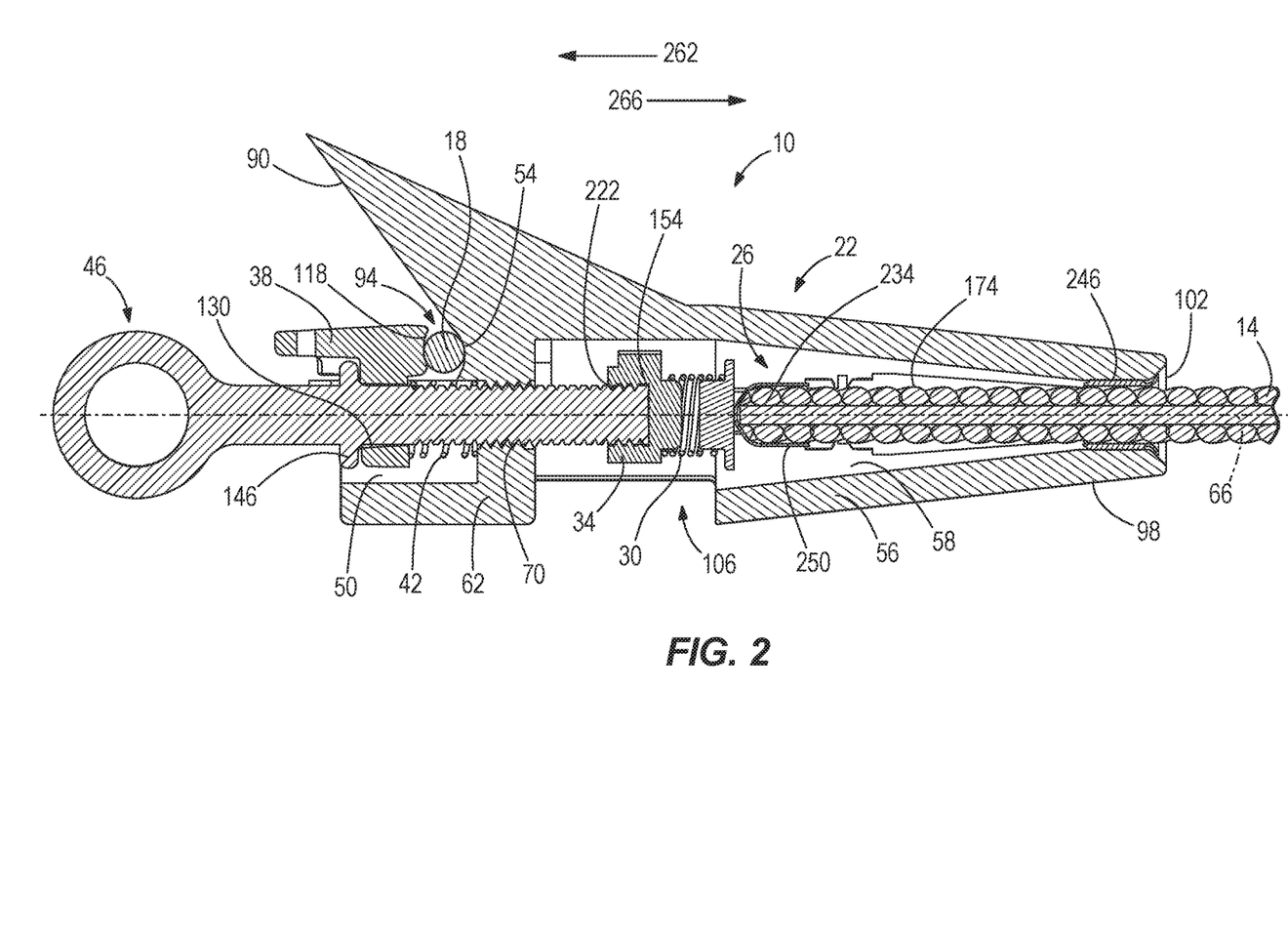
FIG. 2 is a section view of the connection system of FIG. 1 viewed along section 2-2.
Figure 3:
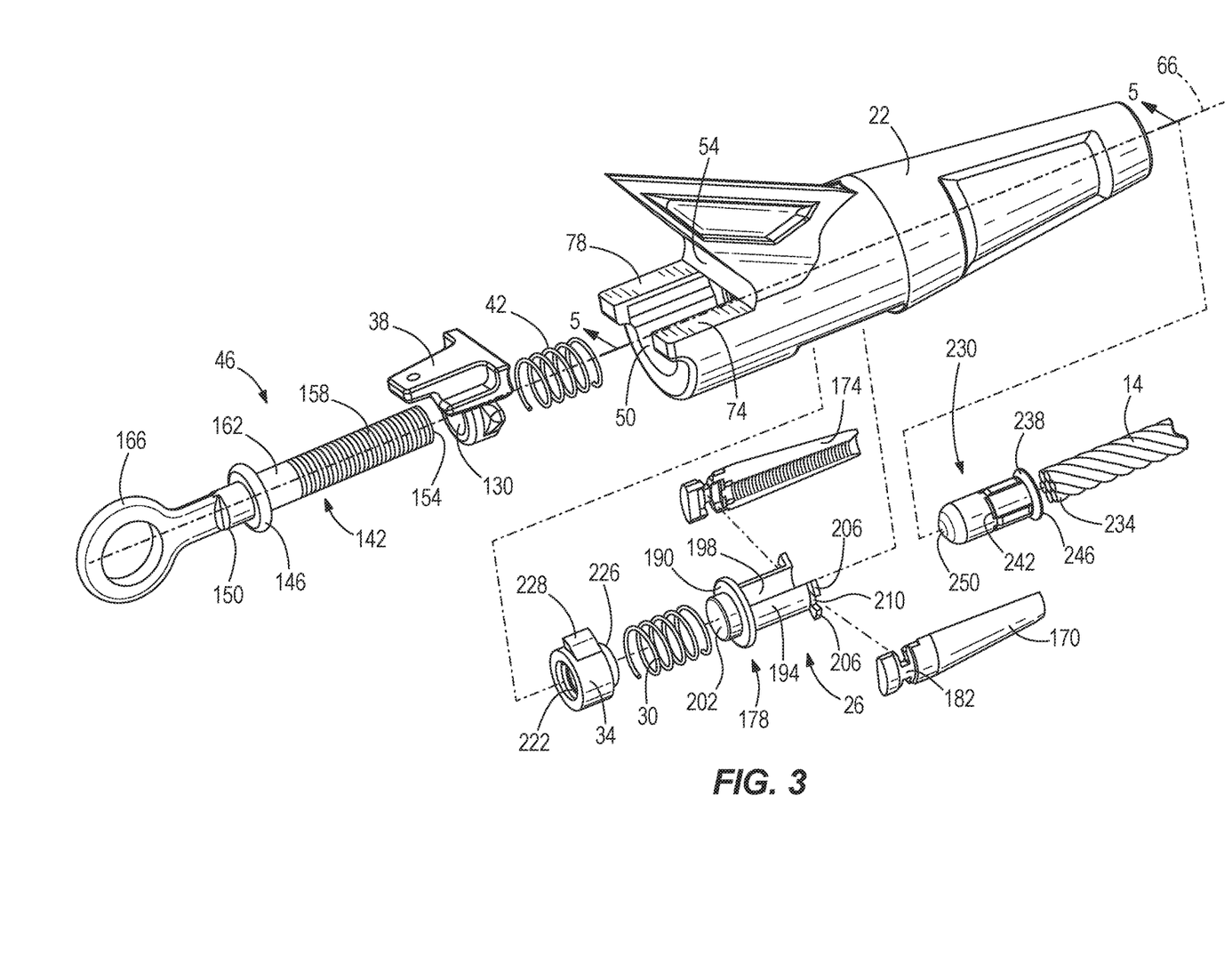
FIG. 3 is an exploded view of the connection system of FIG. 1.

FIG. 1 illustrates a connection system 10 for electrically connecting a first conductor 14 and a second conductor 18. In one embodiment, the second conductor 18 is a hot or live wire. As shown in FIGS. 2 and 3, the connection system 10 includes a housing 22, a jaw assembly 26 (FIG. 3), a first resilient member 30, a lockout member 34, a clamp member or gripper 38, a second resilient member 42, and a linear actuator 46.

Figure 4:
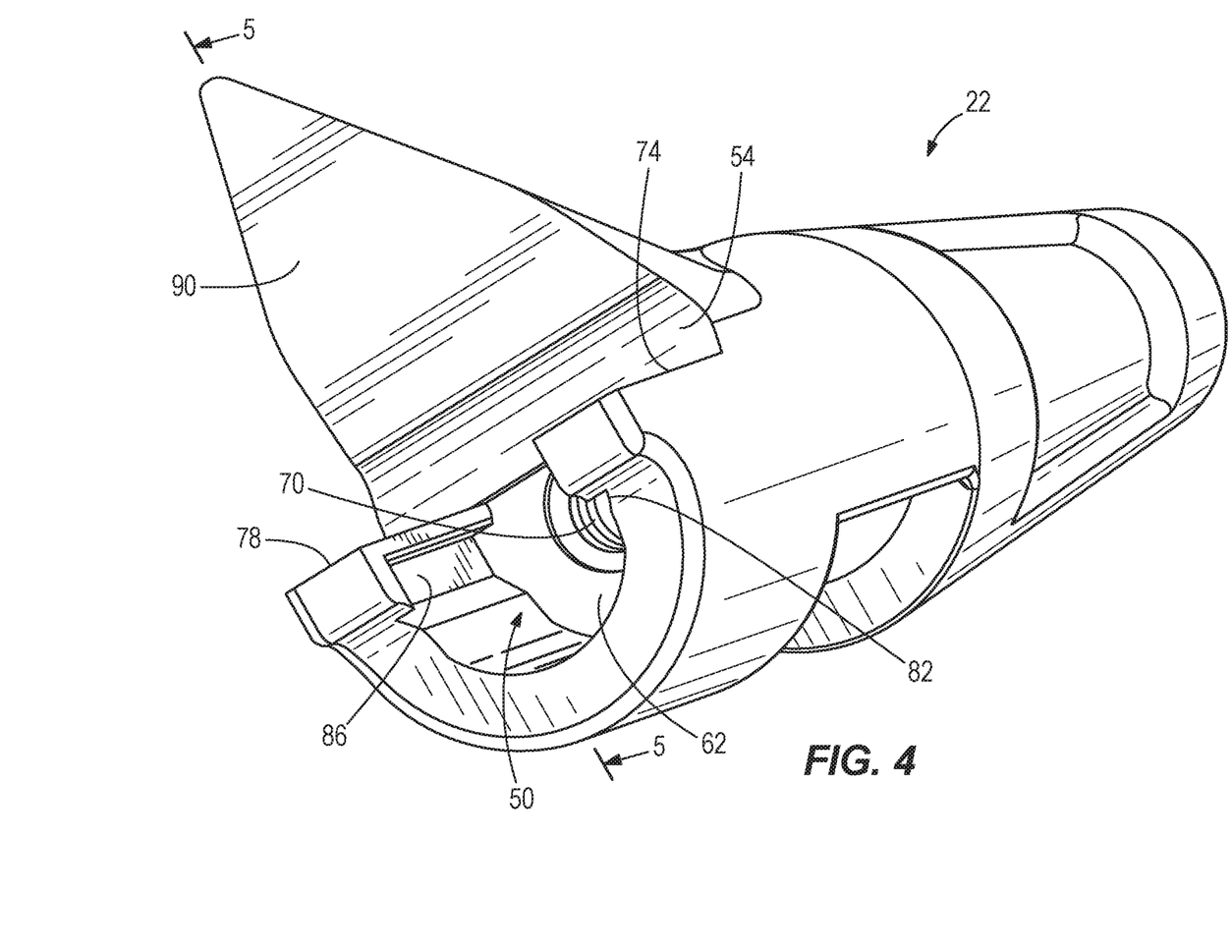
FIG. 4 is a perspective view of a housing.
Figure 5:
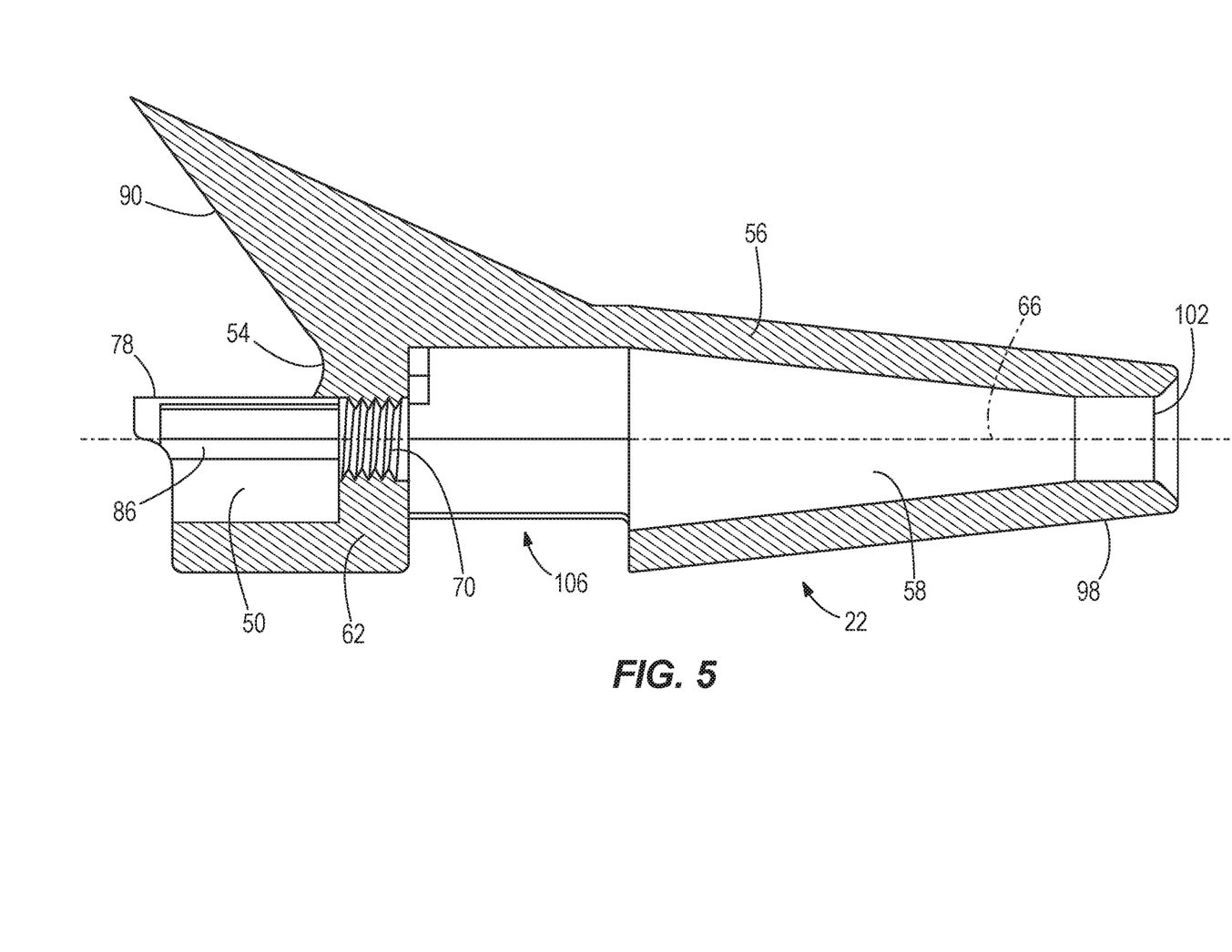
FIG. 5 is a section view of the housing of FIG. 4 viewed along section 5-5.

As shown in FIGS. 4 and 5, the housing 22 includes a housing channel 50, a housing surface 54, a sidewall 56 that at least partially encloses a housing chamber 58, and a wall 62 positioned between the housing channel 50 and the housing chamber 58. In the illustrated embodiment, the sidewall 56 extends away from the wall 62 along a longitudinal axis 66, and the housing channel 50 also extends along the longitudinal axis 66. The wall 62 includes a housing bore 70 that is aligned with the longitudinal axis 66. In the illustrated embodiment, the housing bore 70 is threaded. In some embodiments, the housing 22 is made from a conductive material.

In the illustrated embodiment, the housing channel 50 is substantially U-shaped such that the channel 50 extends between a first upper surface 74 and a second upper surface 78, although the housing channel may have a different shape in other embodiments. The housing channel 50 is positioned adjacent the wall 62. As discussed in greater detail below, the housing channel 50 is sized to receive a portion of the gripper 38 (FIG. 2). In the illustrated embodiment, a first track 82 and a second track 86 are positioned on the sides of the housing channel 50, with the first track 82 adjacent the first upper surface 74 and the second track 86 adjacent the second upper surface 78. The first track 82 and the second track 86 are spaced apart laterally from one another on opposite sides of the longitudinal axis 66 and extend parallel to the longitudinal axis 66. In other embodiments, the housing 22 may include fewer or more tracks, and the tracks 82, 86 may be positioned in a different manner. In the illustrated embodiments, the housing 22 is a unitary housing. In other embodiments, the housing 22 may include multiple housing members. For example, the housing channel 50 and the sidewall 56 may be formed on separate parts that are secured together.

As shown in FIG. 3, the housing surface 54 is positioned between an inclined surface 90 and the upper surfaces 74, 78 of the housing 22. The housing surface 54 may be curved and engages or abuts a portion of the second conductor 18. In the illustrated embodiment, the housing surface 54 is elongated and extends in a direction substantially perpendicular to the longitudinal axis 66 and partially forms a channel 94 (FIG. 2) for receiving the second conductor 18. In other constructions, the housing surface 54 and the longitudinal axis 66 may have a different geometric relationship. For example, the housing surface 54 and the longitudinal axis 66 may be oriented at an angle relative to one another, but not mutually perpendicular.

As shown in FIG. 5, the sidewall 56 extends between the wall 62 and an end 98 of the housing 22. In the illustrated embodiment, the sidewall 56 tapers such that the sidewall 56 has a first diameter proximate the wall 62 and a second diameter proximate the end 98, with the second diameter being smaller than the first diameter. The end 98 of the housing 22 includes a first opening 102 in communication with the housing chamber 58. The first opening 102 receives the first conductor 14 (FIG. 2). A second opening 106 is formed in the sidewall and is also in communication with the housing chamber 58. The second opening 106 is positioned adjacent the wall 62. The second opening 106 receives the jaw assembly 26, the first resilient member 30, and the lockout member 34 (FIG. 2).

Figure 6:
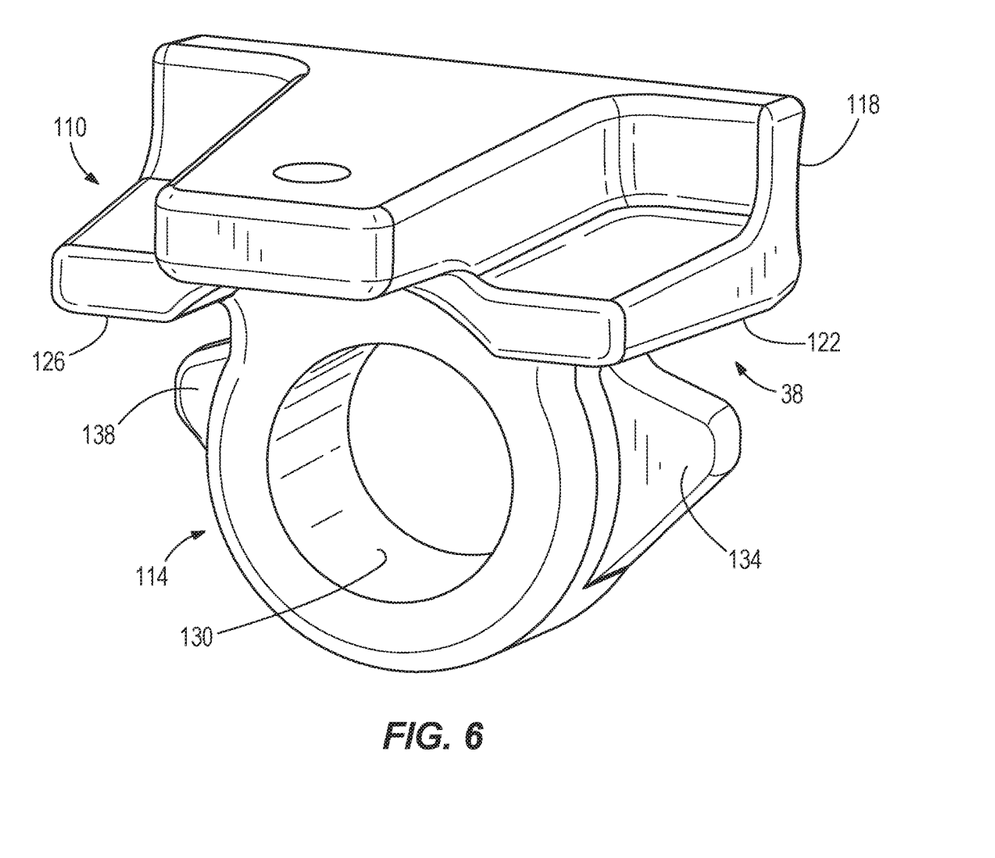
FIG. 6 is a perspective view of a gripper.

As shown in FIG. 6, the gripper 38 includes a first portion 110 and a second portion 114 coupled to the first portion 110. The first portion 110 of the gripper 38 includes a clamp surface 118, a first slide portion 122, and a second slide portion 126. In the illustrated embodiment, the clamp surface 118 is an elongated surface extending laterally between the first slide portion 122 and the second slide portion 126. The clamp surface 118 is curved and engages a portion of the second conductor 18. The clamp surface 118 cooperates with the first surface 54 to form the channel 94 (FIG. 2) for receiving the second conductor 18. The first slide portion 122 and the second slide portion 126 are spaced apart laterally and oriented perpendicular to the clamp surface 118. In the illustrated embodiment, the first slide portion 122 and the second slide portion 126 have flat lower surfaces. The first slide portion 122 and the second slide portion 126 engage the first upper surface 74 and the second upper surface 78 (FIG. 1) of the housing 22, respectively.

Figure 7:
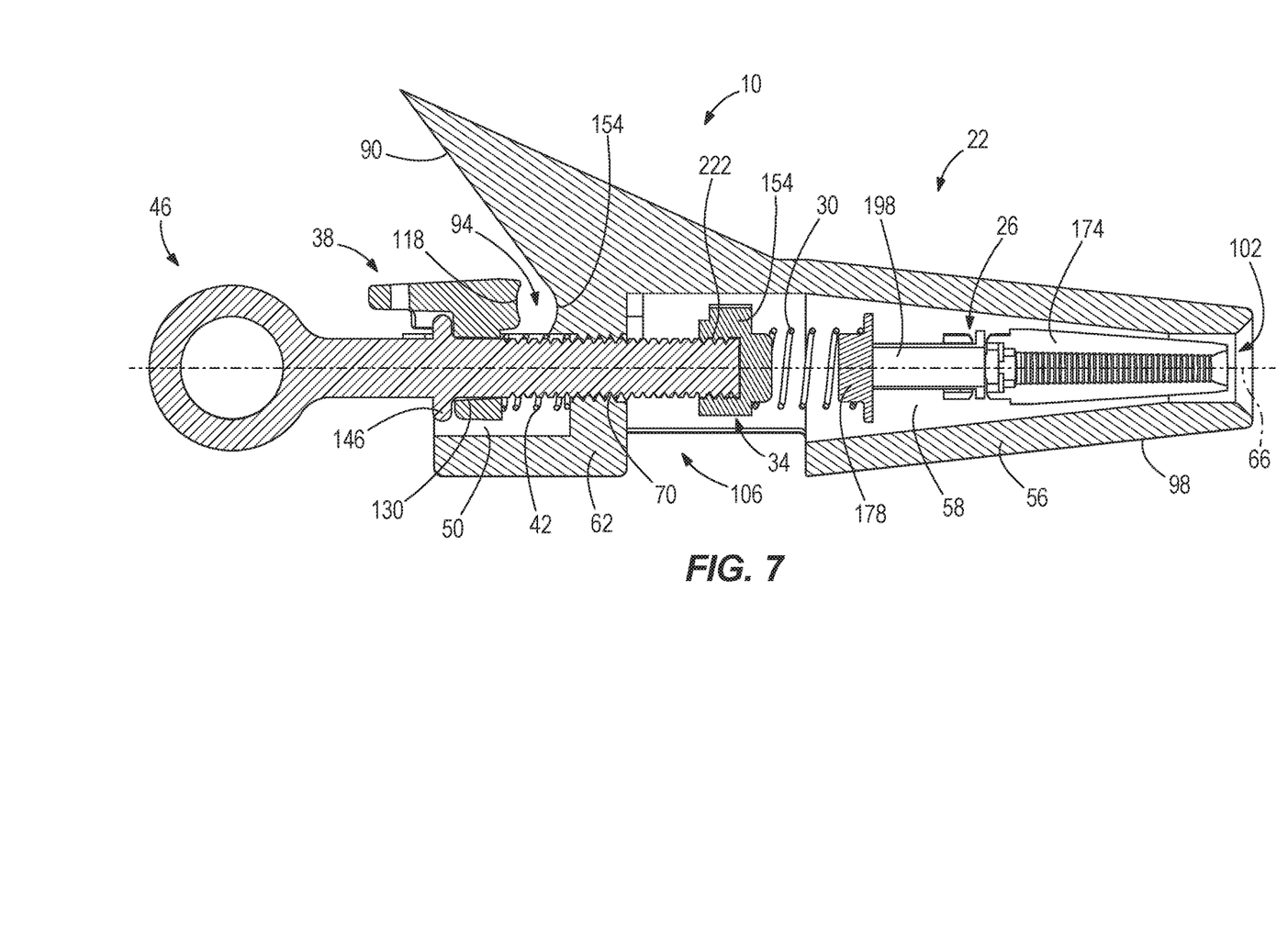
FIG. 7 is a section view of the connection system of FIG. 1 viewed along section 2-2 with the linear actuator in an engaged position.
Figure 8:
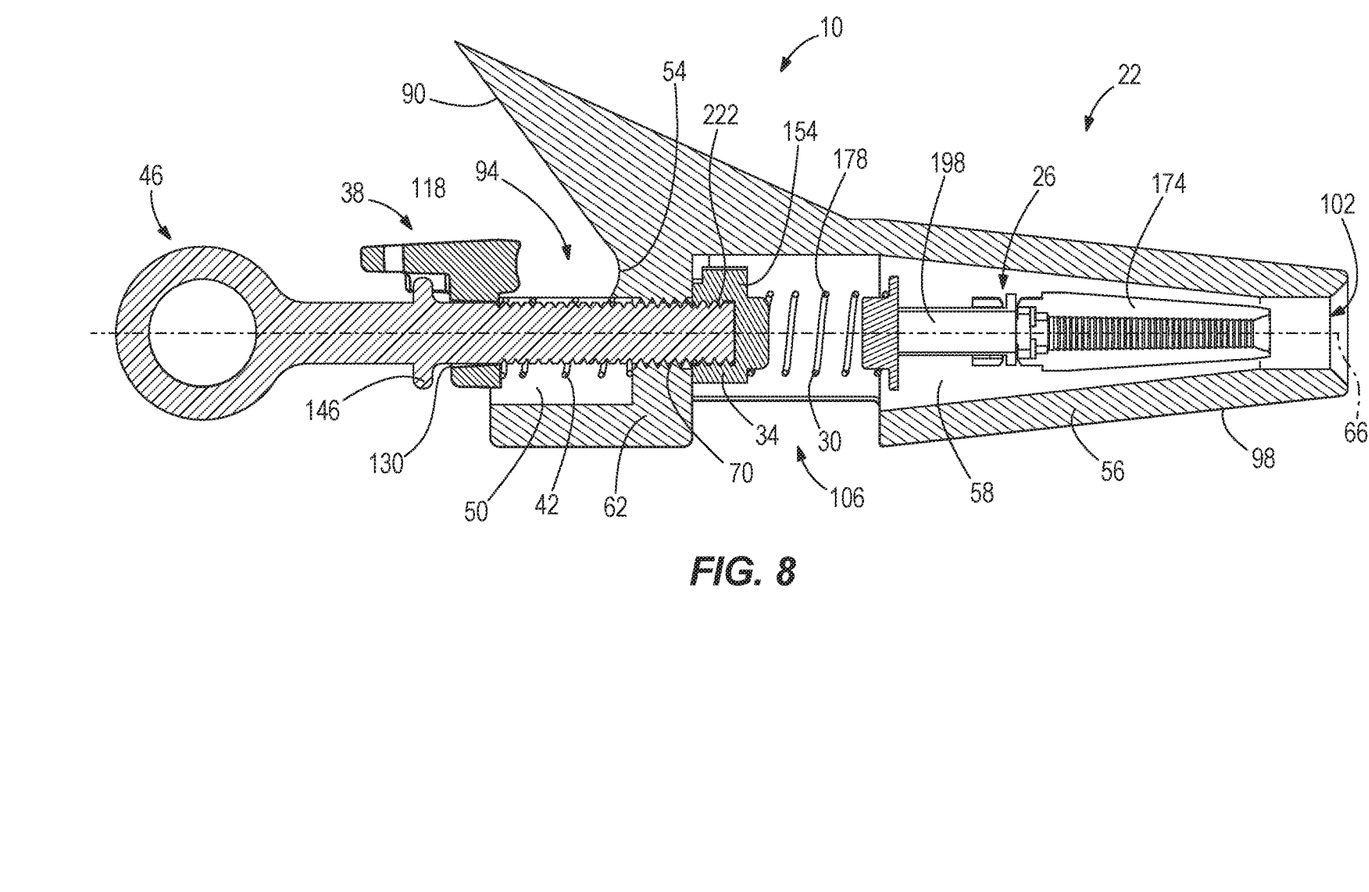
FIG. 8 is a section view of the connection system of FIG. 1 viewed along section 2-2 with the linear actuator in a release position.

Referring again to FIG. 6, in the illustrated embodiment, the second portion 114 of the gripper 38 includes an opening 130, a first guide 134, and a second guide 138. The opening 130 is aligned with the longitudinal axis 66 (FIGS. 2, 7-8). The first guide 134 and the second guide 138 are laterally spaced apart and protrude from opposite sides of the second portion 114. In the illustrated embodiment, the first guide 134 and the second guide 138 are substantially triangular. The first guide 134 is positioned within the first track 82 and the second guide 138 is positioned within the second track 86 of the housing 22. In other embodiments, the guides 134, 138 may be formed in a different manner, and/or may engage the tracks 82, 86 in a different manner. In still other embodiments, the guides and tracks may be positioned in a different manner. In further embodiments, the housing 22 and gripper 38 may engage one another in a different manner.

As shown in FIG. 3, the linear actuator 46 includes a shaft 142 and a flange 146. The shaft 142 may include a threaded portion 158 and a non-threaded portion 162. The flange 146 is positioned at a first end 150 of the shaft 142. A second end 154 of the shaft is positioned within the housing chamber 58 (FIGS. 2, 7-8). In the illustrated embodiment, the linear actuator 46 is an eyebolt, and the flange 146 is positioned between the threaded portion 158 and an eye stem 166. The flange 146 abuts a portion of the gripper 38 so that the gripper 38 is movably engaged with the linear actuator 46. In the illustrated embodiment, the flange 146 is circular and sized to be at least partially received by the housing channel 50 (FIG. 2).

As shown in FIG. 3, the jaw assembly 26 includes a first jaw 170, a second jaw 174, and a retainer 178. In the illustrated embodiment, the first jaw 170 and the second jaw 174 are made of a conductive material. The first jaw 170 and the second jaw 174 are elongated and tapered to follow a tapered internal profile of the housing chamber 58. The first jaw 170 and the second jaw 174 have curved inner surfaces that form an opening therebetween. In some embodiments, the curved inner surfaces include a plurality of teeth. The first jaw 170 includes a stem 182 proximate a base end of the first jaw 170. The second jaw 174 includes a stem 186 proximate a base end of the second jaw 174. The retainer 178 includes a body 190, a first leg 194, a second leg 198, and a seat 202. The first leg 194 and the second leg 198 extend from the body 190 in a direction parallel to the longitudinal axis 66 (FIGS. 7-8). The first leg 194 includes a pair of protrusions 206 and a notch 210 positioned between the protrusions 206. The notch 210 engages the stem 182 of the first jaw 170. Similarly, the second leg 198 includes a pair of protrusions and a notch positioned between the protrusions. The notch engages the stem 186 of the second jaw 174.

The seat 202 is positioned adjacent an end of the body 190 opposite the legs 194, 198. The body 190 abuts the first resilient member 30. The first resilient member 30 urges the jaw assembly 26 toward the end 98 (FIG. 2) of the housing 22. In the illustrated embodiment, the first resilient member 30 is a coiled spring.

As shown in FIG. 3, the lockout member 34 includes a bore 222, a seat 226 and a tab 228. The bore 222 engages the second end 154 of the linear actuator 46. In the illustrated embodiment, the bore 222 threadedly engages the second end 154 of the linear actuator 46. In other embodiments, the lockout member 34 may be secured to the linear actuator 46 in a different manner. The seat 226 is positioned at an end of the lockout member 34 opposite the bore 222. The tab 228 protrudes from a side of the lockout member 34. The lockout member 34 abuts the first resilient member 30. When the lockout member 34 is engaged with the second end 154 of the linear actuator 46, the lockout member 34 prevents the second end 154 of linear actuator 46 from being removed from the housing chamber 58.

As shown in FIG. 3, a cap 230 is engaged with a leading end 234 of the first conductor 14. The cap 230 includes a flange 238, apertures 242, an open end 246, and a closed end 250. The cap 230 has a cylindrical outer surface and, in the illustrated embodiment, the closed end 250 is rounded. The flange 238 surrounds the open end 246 of the cap 230. The apertures 242 are spaced apart around a periphery or outer surface of the cap 230. The apertures 242 create a frangible portion or fracture plane in the cap 230, causing the cap 230 to break so that the open end 246 is separated from the closed end 250 (FIG. 2) when the force exerted on the cap 230 exceeds a predetermined level.

Referring now to FIGS. 7 and 8, the second portion 114 of the gripper 38 and the second resilient member 42 are positioned within the housing channel 50 and aligned with the longitudinal axis 66. The linear actuator 46 is aligned with the longitudinal axis 66 and extends through the opening 130 of the gripper 38 and the housing bore 70 so that the second end 154 is positioned within the housing chamber 58. The second resilient member 42 abuts the wall 62 of the housing 22 and the gripper 38 so that the second resilient member 42 biases the gripper 38 away from the housing 22. In the illustrated embodiment, the second resilient member 42 is a compression spring. The housing surface 54 and the clamp surface 118 are aligned in a facing relationship to co-operatively form the channel 94 therebetween. Since the gripper 38 is movable relative to the housing 22, the channel 94 has a variable width to accommodate a variety of sizes of conductor.

With continued reference to FIGS. 7 and 8, the end 154 of the linear actuator 46 is positioned within the housing chamber 58 and coupled to the lockout member 34. The first resilient member 30 is positioned between the lockout member 34 and the retainer 178. The first jaw 170 and the second jaw 174 are engaged with the retainer 178 and positioned proximate the end 98 of the housing 22. The first resilient member 30 biases the jaw assembly 26 towards the tapered end 98. The linear actuator 46 is continuously repositionable between a released position (FIG. 8) and an engaged position (FIG. 7). In the released position, the linear actuator 46 is extended relative to the housing 22. The cap 230 (FIG. 3) is positioned within the first opening 102 of the housing 22 so that the closed end 250 (FIG. 2) is positioned within the housing chamber 58 and the flange 238 (FIG. 2) is seated against the first opening 102.

To assemble the connection system, the linear actuator 46 is inserted through the opening 130 of the gripper 38 and through the second resilient member 42. The linear actuator 46 is threaded into the housing bore 70 until the second end 154 is positioned within the housing chamber 58. The lockout member 34 is inserted through the second opening 106 in the housing 22 and is engaged with the linear actuator 46. In embodiments in which the linear actuator 46 is threaded, an operator may grip the tab 228 to thread the linear actuator 46 into the lockout member 34. In some embodiments, the threads of the linear actuator 46 that are engaged with the lockout member 34 may be damaged or peened to prevent the linear actuator 46 from disengaging from the lockout member 34 and passing through the housing bore 70; in other embodiments, the linear actuator 46 may be secured to the lockout member 34 in another manner. The jaw assembly 26 is assembled by engaging the stem 182 of the first jaw 170 with the notch 210 of the first leg 194 of the retainer 178, and also engaging the stem 186 of the second jaw 174 with the notch 218 of the second leg 198 of the retainer 178. The jaw assembly 26 is then inserted through the second opening 106 of the housing 22 and pushed into the tapered end 98. The first resilient member 30 is inserted through the second opening 106 in the housing 22 and positioned between the seat 202 of the retainer 178 and the seat 226 of the lockout member 34 to bias the jaw assembly 26 toward the tapered end 98 of the housing 22.

With reference to FIG. 2, to connect the first conductor 14 with the second conductor 18 via the connection system 10, the first conductor 14 is aligned with the longitudinal axis 66. The leading end 234 of the first conductor 14 is inserted into the cap 230 to prevent multiple strands of the first conductor 14 from unraveling as the first conductor 14 is inserted into the housing 22. The first conductor 14 and cap 230 are inserted into the opening 102 in a direction 262. When the insertion force exceeds a predetermined level, the cap 230 breaks proximate the apertures 242.

After the cap 230 breaks, the open end 246 of the cap 230 remains seated in the first opening 102 and the closed end 250 of the cap 230 and the leading end 234 of the conductor 14 are inserted further into the housing chamber 58. The closed end 250 of the cap 230 and the first conductor 14 contact the central opening of the jaw assembly 26 and push the jaw assembly 26 against a biasing force of the first resilient member 30 in the direction 262. As the jaw assembly 26 is pushed in the direction 262, a space between the jaws 170, 174 increases. The leading end 234 of the first conductor 14 slides into the central opening between the first jaw 170 and the second jaw 174, splaying the first jaw 170 and the second jaw 174 apart. In some embodiments, the first conductor 14 is pushed further into the housing chamber 58 of the housing 22 until the cap 230 contacts the retainer 178.

Once the first conductor 14 has been fully inserted into the housing 22, the operator releases the first conductor 14, removing the force that overcomes the force exerted by the first resilient member 30. The first resilient member 30 biases the jaw assembly 26 in a direction 266. The jaws 170, 174 are pushed against the tapered end 98 of the housing 22 and clamp toward each other, around the first conductor 14. After releasing the first conductor 14, the operator may pull the first conductor 14 in the direction shown by the arrow 266 to urge the jaws 170, 174 into tighter engagement with the tapered end 98 of the housing 22.

After installing the first conductor 14, the operator aligns the second conductor 18 along the inclined surface 90 of the housing 22 and slides the second conductor 18 into the channel 94 positioned between the housing surface 54 and the clamp surface 118 of the gripper 38. Alternatively, the operator may align the second conductor 18 between the housing surface 54 and the gripper 38 and then pull the second conductor 18 through channel 94. The operator threads the linear actuator 46 relative to the housing bore 70, pulling the gripper 38 toward the housing 22 against the bias of the second resilient member 42. A distance between the housing surface 54 of the housing 22 and the clamp surface 118 of the gripper 38 decreases. The flange 146 of the linear actuator 46 engages the gripper 38 and slides the gripper 38 toward the housing 22. The first guide 134 and the second guide 138 of the gripper 38 travel along the first track 82 and the second track 86, respectively, of the housing 22. The positioning of the guides 134, 138 of the gripper 38 within the tracks 82, 86 of the housing 22 prevents the gripper 38 from rotating with respect to the housing 22 as the linear actuator 46 is rotated, and maintains the clamp surface 118 in a parallel orientation with respect to the housing surface 54.

As the linear actuator 46 is threaded relative to the housing bore 70, the linear actuator 46 urges the lockout member 34 and the jaw assembly 26 in the direction 266 towards the first opening 102. The diameter of the tapered end 98 decreases in the direction 266, so the jaws 170, 174 are clamped more tightly around the first conductor 14 as the linear actuator 46 is threaded into the housing bore 70 to secure the second conductor 18 (FIG. 7). If the linear actuator 46 is inserted beyond a predetermined distance, the lockout member 34 contacts the seat 202 of the retainer 178, thereby providing a mechanical stop or lockout.

In the embodiment shown in FIGS. 1 and 2, the second conductor 18 is a live conductor. An electric current travels from the second conductor 18 through the housing 22, the first jaw 155, and the second jaw 174 to the first conductor 14.

Although some aspects have been described in detail with reference to certain preferred embodiments, variations and modification exist within the scope and spirit of one or more independent aspects as described. Various features and advantages are set forth in the following claims.

What is claimed is:

1. A connection system for providing electrical contact between a first conductor and a second conductor, the connection system comprising:
   a housing including a sidewall, a housing surface, and a housing channel, the sidewall extending between a first end and a second end, the sidewall at least partially enclosing a housing chamber;
   at least one jaw supported for movement within the housing chamber of the housing and configured to engage the first conductor;
   a clamp member at least partially disposed within the housing channel, the clamp member including a second clamp surface proximate the housing surface in a facing relationship;
   a linear actuator coupled to the housing and movable along a longitudinal axis, the linear actuator coupling the housing and the clamp member and movably coupled to the at least one jaw.

2. The connection system of claim 1, further comprising a jaw biasing member, the jaw biasing member configured to urge the at least one jaw towards the first end of the housing.

3. The connection system of claim 2, further comprising a retainer configured to engage the at least one jaw, the jaw biasing member positioned between an end of the linear actuator and the retainer.

4. The connection system of claim 3, wherein the linear actuator is operable to decrease a distance between the at least one jaw and the first end of the sidewall.

5. The connection system of claim 1, further comprising a lockout member disposed within the housing chamber, the lockout member engageable with the linear actuator to prevent movement of the linear actuator in a first direction along the longitudinal axis beyond a predetermined limit.

6. The connection system of claim 1, wherein the housing includes a second wall having an opening, wherein the linear actuator is threadably connected to the second wall and extends through the opening.

7. The connection system of claim 1, further comprising a clamp member biasing member, the clamp member biasing member urging the clamp member away from the housing.

8. The connection system of claim 1, wherein the linear actuator includes a stop surface, and the clamp member is positioned between the stop surface and the housing.

9. The connection system of claim 8, wherein the linear actuator is movable along the longitudinal axis to decrease a distance between the clamp member and the housing.

10. The connection system of claim 1, wherein the housing and the at least one jaw are electrically conductive.

11. A method for providing electrical communication between a first conductor and a second conductor, the method comprising:
    positioning the first conductor between a first jaw and a second jaw disposed within a chamber of a housing;
    biasing the first jaw and the second jaw towards an end of the housing to secure the first conductor between the first jaw and the second jaw;
    positioning the second conductor between a surface of the housing and a surface of a clamp member, the surface of the housing and the surface of the clamp member having a facing relationship; and
    actuating a threaded member to decrease a distance between the clamp member and the housing to secure the second conductor between the surface of the housing and the surface of the clamp member.

12. The method of claim 11, wherein actuating the threaded member includes moving at least a portion of the clamp member within a channel of the housing.

13. The method of claim 11, wherein actuating the threaded member includes threading the threaded member through an opening in a wall of the housing.

14. The method of claim 11, wherein actuating the threaded member increases a clamping force exerted by the first jaw and the second jaw on the first conductor.

15. The method of claim 11, wherein the threaded member is threadably engaged with a lockout member disposed within the chamber, the first biasing member being disposed between the lockout member and a retainer engaging the first jaw and the second jaw.

16. The method of claim 11, wherein the housing, the first jaw, and the second jaw are electrically conductive.

17. A method for assembling a connection system configured to engage a first conductor with a second conductor, the method comprising:
    inserting a linear actuator through an opening of a clamp member and a clamp member biasing member;
    inserting the linear actuator through an opening in a wall of a housing into a chamber of the housing;
    engaging a lockout member with an end of the linear actuator;
    inserting at least one jaw through an opening of the housing into the chamber; and
    biasing the at least one jaw towards a first end of the housing.

18. The method of claim 17, further comprising the step of engaging the at least one jaw with a retainer and positioning a biasing member between the lockout member and the retainer.

19. The method of claim 17, wherein the linear actuator and the opening in the wall of the housing are threadedly engaged.

20. The method of claim 17, wherein the linear actuator includes a stop surface configured to engage the clamp member.

21. The method of claim 17, wherein the chamber is positioned between the first end of the housing and the wall.

22. The method of claim 17, wherein a portion of the clamp member is positioned within a channel positioned between the wall and a second end of the housing.

* * * * *